United States Patent [19]
Hernandez

[11] 4,267,595
[45] May 12, 1981

[54] AMI DECODER APPARATUS
[75] Inventor: Victor M. Hernandez, Roanoke, Va.
[73] Assignee: International Telephone and Telegraph Corporation, New York, N.Y.
[21] Appl. No.: 118,035
[22] Filed: Feb. 4, 1980
[51] Int. Cl.$^3$ .............................................. G11B 5/09
[52] U.S. Cl. ...................... 375/95; 360/43; 375/110
[58] Field of Search ............... 307/233 R; 375/49, 78, 375/80, 82, 94, 95, 110; 360/40, 42, 43, 44, 48

[56] References Cited
U.S. PATENT DOCUMENTS

| | | | |
|---|---|---|---|
| 3,665,103 | 5/1972 | Watkins | 375/49 |
| 3,737,896 | 6/1973 | Gabor | 360/43 |
| 3,968,328 | 7/1976 | Tsuchiya et al. | 375/95 |
| 4,071,692 | 1/1978 | Wier et al. | 375/110 |
| 4,167,760 | 9/1978 | Decker | 360/43 |

Primary Examiner—Benedict V. Safourek
Attorney, Agent, or Firm—John T. O'Halloran; Peter C. Van Der Sluys

[57] ABSTRACT

A decoder is provided which does not require the use of a retiming circuit. The decoder operates with an AMI signal, and operates to detect a transition occurring at the center of a bit cell to blank out those transitions which do not coincide with the encoding clock. The decision is made by examining the time between received transitions. Once this is accomplished, an asynchronous logic circuit with two states of memory can be used to structure the decoded AMI data into a NRZ or other format by storing the transitions which occur in the middle of the previous bit cell and outputting a first binary value during the following bit cell for a transition, or if no transitions have occurred in the middle of the previous bit cell, a second binary value is outputted during the following bit period.

11 Claims, 6 Drawing Figures

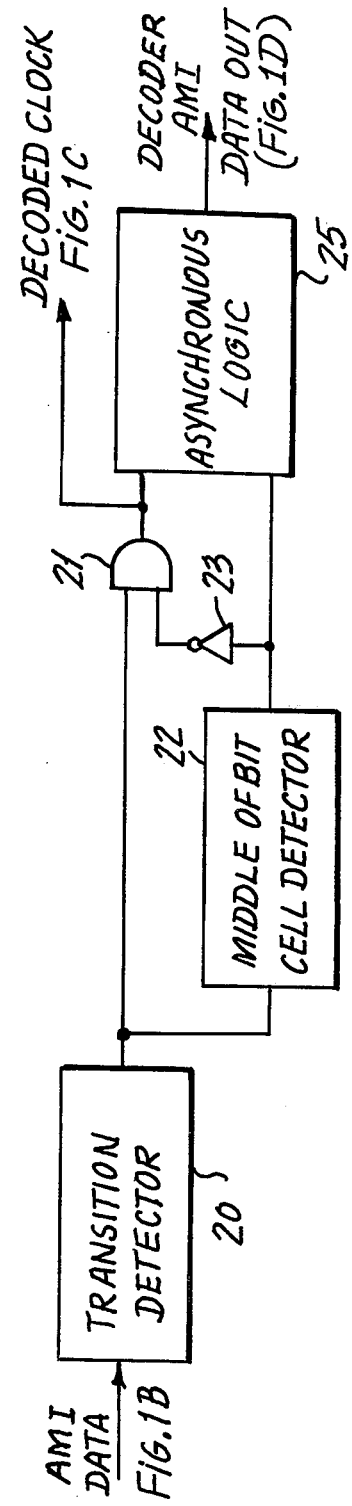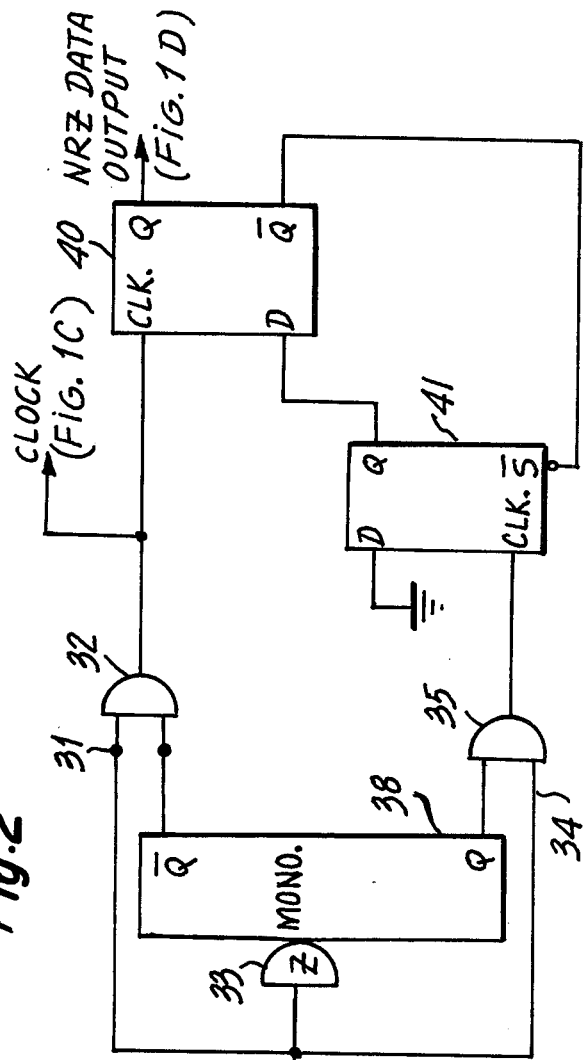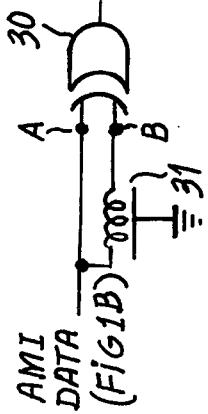
Fig.2
Fig.3

AMI DECODER APPARATUS

FIELD OF INVENTION

This invention relates to an AMI decoder apparatus and more particularly to an AMI decoder apparatus which does not require a separate retiming system.

BACKGROUND OF THE INVENTION

The digital transmission system offers significant advantages over an analog system. In the digital system, the message is coded into a signal which can be regenerated rather than amplified at each repeater location. Normally, the digital system requires a greater bandwidth, but the digital system can operate with a lower signal to noise ratio. In addition, the cost of a digital terminal is less than that of an analog terminal.

The typical digital transmission system employs an encoder at a transmission location, which encoder functions to code a desired signal, which may be an analog signal (audio, speech and so on) into a digital signal which is then transmitted over the communications link or channel. The receiver consists of a decoder. The function of the decoder is to convert the signal back into its original form or the form the signal possesses prior to encoding. In this manner, the decoded signal can further be processed to provide the original analog signal or the signal information content. As such, the digital systems employ a series of pulses to carry the information over the channel. There are numerous ways of modifying the characteristics of a train of pulses to convey information. Such systems which are in widespread use are referred to as PCM or pulse code modulation systems. As one can ascertain, there are numerous techniques of modulating pulse trains to convey information which are encompassed within PCM systems.

A particular useful form of a PCM signal type is referred to as AMI or Alternate Mark Inversion. In this coding system, a transition occurs at the beginning of every binary bit or every symbol in a train of pulses. One binary value (as a binary one) is manifested by a second transition one-half period later, while a second value (binary zero) has no second transition. The AMI code provides a balanced representation of a PCM bit stream and tends to minimize the average DC (direct current) level on a transmission line, as compared to other codes. Examples of AMI systems and circuitry for encoding and decoding such signals is had by reference to U.S. Pat. No. 4,071,692 entitled DATA TRANSMISSION SYSTEMS issued on Jan. 21, 1978 to Donald A. Weir et al and assigned to the International Standard Electric Corporation.

In any event, as indicated above, the digital transmission system normally requires regeneration and decoding. The decoding process is typically and conventionally associated with a synchronous decoding scheme. In this manner, the received digital signal is processed to formulate a signal which is synchronized to the transmitted signal and therefore is "locked" or synchronized to the encoded signal or clock. In obtaining this signal, the prior art employed a retiming circuit such as a phase locked loop (PLL) or an injection locked oscillator (ILO). These retiming circuits, the PLL and the ILO have a long transient response and generally poor reliability. Such characteristics provide problems in reliable decoding and reliable system operation and obviously should be avoided. These problems are coupled with the additional circuitry required and hence, additional costs necessary to implement retiming functions.

It is therefore an object of this invention to provide an improved decoder particularly adapted to decode AMI signals, which decoder is extremely reliable and simple to implement and which decoder does not require retiming circuitry.

BRIEF DESCRIPTION OF THE PREFERRED EMBODIMENT

A decoder apparatus for use in a data transmission system in which information is conveyed in a bit stream consisting of a plurality of sequential bit cells, said stream of the type employing an alternate mark inversion (AMI) code, wherein the start of each bit cell is manifested by a first transition, each bit cell having a given duration T, with those bits indicative of a first binary value further possessing a transition relatively at the center of said bit duration (T/2) to distinguish this first binary value from a second binary bit value with those bits of said second value having no transition at said center, said decoder comprising a transition detector responsive to said AMI bit stream for providing at an output, a plurality of pulses indicative of each and every transition in said AMI bit stream, a center bit cell detector responsive to said plurality of pulses for responding to only those pulses indicative of said center transition and therefore of said first binary value, and logic means responsive to said plurality of pulses and said detected pulses to provide at an output, a digital signal indicative of the information conveyed by said AMI coded bit stream, by outputting a first binary level during a next succeeding start pulse when a transition was detected at the center of the previous pulse, and outputting a second binary level when a transition was not detected, whereby said output digital signal manifests the original information encoded within said AMI bit stream.

BRIEF DESCRIPTION OF THE DRAWINGS

FIG. 2 is a simplified block diagram of an AMI decoder according to this invention; and FIG. 3 is a detailed logic circuit diagram of an embodiment of a decoder.

DETAILED DESCRIPTION OF THE INVENTION

Figure 1:
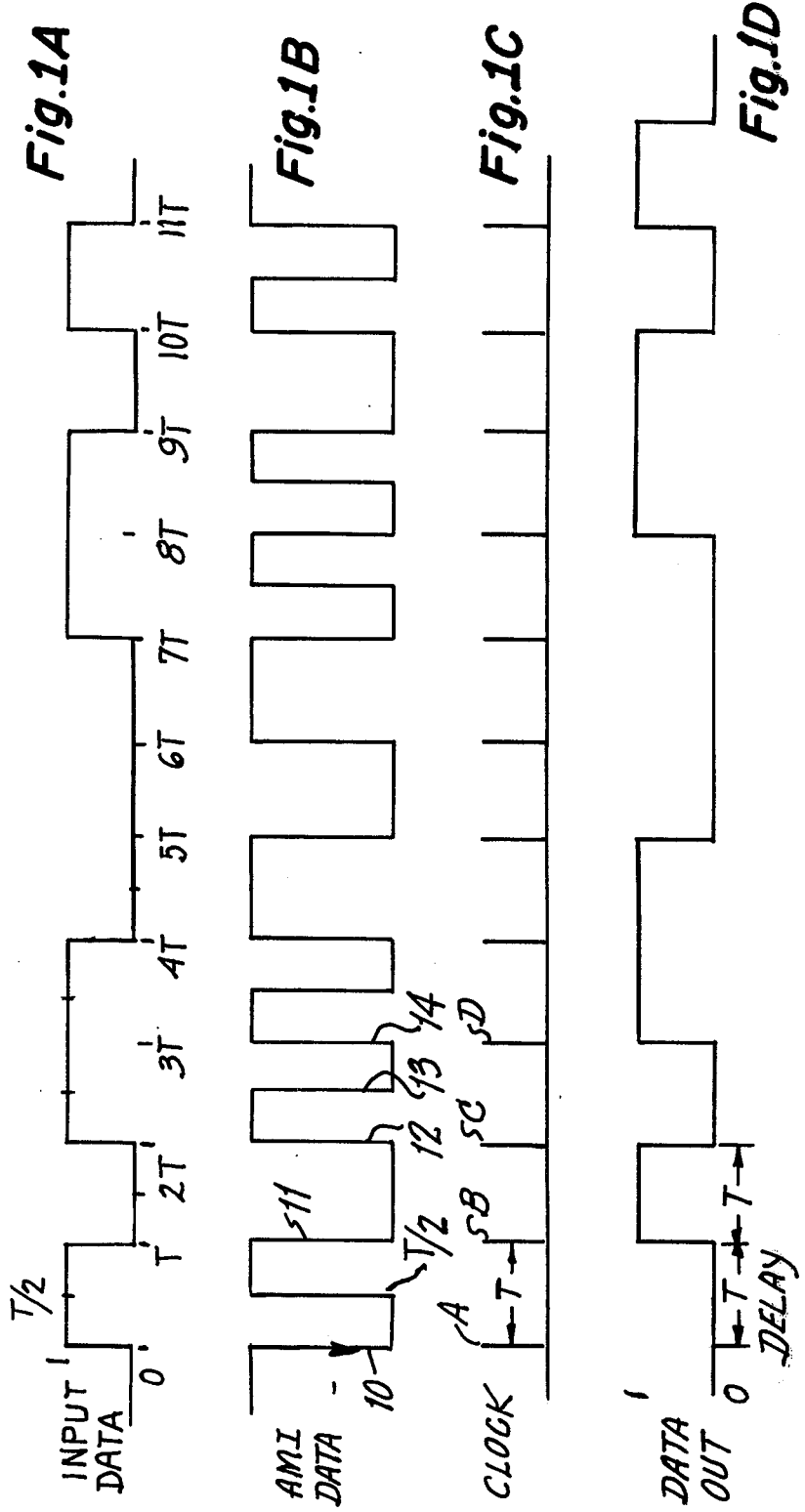
FIGS. 1A to 1D depict a series of waveforms useful in explaining the operation of the decoder apparatus according to this invention.

As indicated above, the Alternate Mark Inversion (AMI) code and the signals generated according to this code are determined as follows:

A transition as a positive or negative edge occurs at the beginning of each symbol (a symbol being a binary one or a binary zero). One symbol, as for example, the binary one, is further distinguished from the other symbol (as a binary zero) by a second transition which occurs one-half (½) period later. The other symbol (as a binary zero) has no transition occurring at the one-half period interval. In this manner, the start of each symbol is defined by an alternate transition or mark and the weight of one symbol is further distinguished from the other by another transition prior to completion of the complete symbol duration. It is this very structure of the AMI code which, according to this invention, enables one to fully decode the data as well as the data rate without employing or using a retiming circuit.

Referring to FIG. 1, there is shown a series of waveform diagrams 1A to 1D useful in explaining the operation of this invention and the general nature of the AMI code.

FIG. 1A is a waveform of a digital signal of the type which might be applied to the input of an AMI encoder at a transmission site. The information conveyed by the waveform may have been generated by an analog to digital converter located at the transmission site and could be indicative of an audio signal and so on. It is, of course, understood that there are many techniques for generating digital signals from analog data and such techniques are well known and understood in the art.

For purposes of discussion, each bit or bit cell shown in FIG. 1A has a duration T and a binary one is represented by a first level as "1" and a binary zero by a second level as "0". Thus, the digital value conveyed by the waveform of FIG. 1A determined from left to right is 10110001101.

The input data signal (FIG. 1A) is then applied to the input of a conventional AMI encoder, which enclocler provides at an output, the AMI data signal (FIG. 1B) for subsequent transmission over a communications link.

Referring to FIG. 1B and considering the constraints imposed by the AMI code, the signal of FIG. 1B is explained as follows: The first bit cell (left) is a binary one of a duration T. The AMI signal therefore has a first transition 10 in a negative direction. For purposes of explanation, the first transition is defined as being in a negative direction. It is understood that this is arbitrary and a transition in any direction will suffice. Since the first symbol is a binary one, the AMI data signal exhibits a second transition, one-half period later or at T/2. The end of the first bit coincides with the start of the second bit (binary zero) and hence, there is another transition 11 indicative of the start of the second bit or second symbol. Since this is a binary zero, there is no transition one-half period later. The transition 12 indicates the start of the third bit which is a binary one, and hence, transition 13 is shown at the one-half period point. Transition 14 denotes the start of the fourth bit (also a one) and so on.

FIG. 1C depicts a waveform of the data clock, which essentially is a series of pulses of a given duration having a repetition rate of period T. It is understood that the data rate can vary widely as can the bit duration T depending on the particular system requirements. It is further understood that the AMI data need not be at the same rate as the input data and hence, a separate clock (FIG. 1C) can be employed to encode data signals (FIG. 1A) relatively independent of the data rate. Techniques as data compression, companding, expanding and so on as employed in digital signal formation and processing are all applicable.

In FIG. 1D, there is shown a waveform labelled DATA OUT and this waveform is obtained from the decoder according to this invention. Essentially, as will be explained, the waveform of FIG. 1D is relatively identical or equal to the waveform of FIG. 1A, with the exception of a one clock period time shift.

Referring to FIG. 2, there is shown a simple block diagram of a decoder according to this invention and which decoder will decode an AMI waveform (FIG. 1B) into an output data waveform (FIG. 1D) without using or requiring a retiming system. The following set tasks are required to be accomplished to perform the decoding function. It will be understood by those skilled in the art that the system operation to be explained may be implemented in various ways and a particular embodiment will be discussed in conjunction with FIG. 3.

FIG. 2 shows a block 20 designated as a transition detector. The function of the transition detector 20 is to monitor the incoming AMI data signal and to provide an output pulse for each transition. The output of the transition detector 20 is applied to one input of an AND gate 21, and to the input of module 22, designated as a middle of bit cell detector. Essentially, module 22 functions to investigate the middle (one-half period transition point) of each bit cell to determine whether a transition has occurred at this location. The output of the detector 22 is applied via an inverter 23 to the other input of AND gate 21 and to an input of a module 25 designated as ASYNCHRONOUS LOGIC. As indicated in FIG. 2, the output of gate 21 provides the decoded clock signal (FIG. 1C), which signal is obtained from the AMI data input signal. The asynchronous logic circuit receives this clock signal and the output from the transition detector 22 to provide, for example, a NRZ (non-return to zero) signal. Essentially, the logic circuit 25 possesses two states of memory to structure the processed AMI data signal in the NRZ format by storing the transitions as detected by detector 22 which occur in the middle of a previous bit cell and outputting one logical level (binary one or zero) during the following bit cell when a transition occurred; or if no transition occurred in the center of the previous bit cell, a second logical level (as binary zero or one) is outputted during the following bit period.

By referring to FIG. 1, the operation will be clearer.

Hence, transition detector 20 provides a pulse for each transition in the AMI signal (FIG. 1B). The detector 22 "looks" at the half period or middle of the bit cell content and provides pulses for transitions at T/2 as 13 of FIG. 1B and so on. Hence, gate 21 will only provide an output when there is no transition detected at the center of a bit cell and according to all transitions detected by detector 20. This, therefore, specifies the clock signal (FIG. 1C) provided at the output of gate 21.

As one can see from FIG. 1D, a logical one is outputted by the logic circuit 25 at the DELAY OF T. This occurs as follows: The detector 22 detects the transition at T/2 in the AMI data signal and provides an output pulse. This pulse is inverted by inverter 23 and blocks gate 21. Gate 21 was not blocked during transition 10 or 11 and therefore, provides clock pulses as A and B. Accordingly, gate 21 always provides a pulse at the start of each symbol, indicative of each clock pulse. The transition detected at T/2 (after 10) is stored by the logic circuit 25. This transition occurred in the center of the bit cell (between 10 and 11) and the logic circuit 25 gates out a one during the start of the next bit cell or at clock pulse B. Since the next data bit is a zero, there is no transition in the AMI signal between 11 and 12 and hence, the detector 22 provides no pulse and the logic circuit 25 has no transition and hence, gates out a zero at clock pulse C. Transition 13 again causes detector 22 to respond and this pulse blocks gate 21 and is stored by logic circuit 25. Logic circuit 25 then causes a one to be gated out during clock pulse C and so on. Thus, as one can see, the information contained in the AMI data signal as provided by the encoded input data (FIG. 1A) is simply outputted by the logic circuit 25 as controlled by the inputs from gate 21 and detector 22.

Thus, the decoder shown in FIG. 2 as using the middle of the bit cell transition detector operates to blank out those transitions which do not coincide with the encoding clock. This decision is made by examining the time between received data transitions. Once this is accomplished, the asynchronous logic circuit 25, with two states of memory, structures the data in an NRZ format by storing the transitions which occur in the middle of the previous bit cell and outputting a first binary value during the following bit cell; or if no transitions have occurred in the middle of the previous bit cell, the second binary value is outputted during the following bit period. It is understood that the "one" and "zero" can be reversed, if desired, without effectively changing the operation as described.

Referring to FIG. 3, there is shown one practical embodiment of a decoder which will operate according to the above described principles. It is understood that many alternate configurations will become apparent to those skilled in the art, but the structure depicted in FIG. 3 operates according to the principles herein described and is implemented simply by employing standard integrated circuit components or discrete components.

The gate 30 is an exclusive OR gate having a first input A adapted to receive an AMI data signal as shown, for example, in FIG. 1B. The other input B is in series with a delay line or delay circuit 31 and the AMI data signal is applied to input B via the delay line 31. The exclusive OR gate provides an output pulse according to the logic format $$A\overline{B}+B\overline{A}$$

The magnitude of the delay line 31 is selected to provide a delay equivalent to a relatively small fraction of the duration of a bit cell. Hence, the delay afforded by the delay 35 is substantially less than the period T and may, for example, be about one tenth T. It is understood that the bit cell width, as well as the rate can vary as required and rates in excess of 1 MHz are applicable as well as lower rates.

The delay line and OR gate 30 function as the data transition detector. As one can easily determine, the delay line delays each pulse associated with the AMI by the amount of delay (T/10). Accordingly, the exclusive OR gate 30 in implementing the logic provides a narrow pulse output for each transition, where the effective pulse width is approximately equal to the delay associated with the delay line 31.

The output of the exclusive OR gate 30 is applied to a first input 31 of an AND gate 32, to the input of an inverter gate 33, and to a first input 34 of a second AND gate 35. The output of the inverter gate 33 provides a trigger pulse source for a one-shot or monostable multivibrator 38. The one-shot 38 is a well known circuit component and provides a fixed duration output pulse for each input trigger pulse. The duration of the one-shot 38 is selected to be about ¾ of the bit cell duration (3T/4); although other durations will suffice. The control of the pulse duration of a one-shot is well known as well as many various and alternate circuit configurations for providing monostable operation. The one-shot 38 operates to provide an output pulse upon receipt of a trigger pulse input from gate 33. This gate 33 as inverting the output of gate 30, assures triggering of the one-shot 38 on the falling or trailing edge of the transition pulses.

The one-shot 38 provides a first pulse polarity at the output $\overline{Q}$, which output is coupled to the second input of AND gate 32. The Q output of one-shot 38 provides the inverted pulse to the second input of AND gate 35. Essentially, the one-shot 38 operates in conjunction with gate 35 to examine the center of each bit (T/2) in order to detect a transition in the center of the bit and hence control the binary multivibrators or flip/flops 40 and 41 to output the data as above described.

As shown in FIG. 3, the flip/flop 40 has its clock input coupled to the output of gate 32. The output of gate 32 provides the decoded clock signal (FIG. 1C) of a pulse duration determined by the pulses emanating from gate 30. The D input of the flip/flop 40 is coupled to the Q (non-inverting) output of flip/flop 41.

Flip/flop 41 has its clock input coupled to the output of gate 35 and has its $\overline{S}$ input coupled to the Q output of flip/flop 40. Both flip/flops 40 and 41 are referred to as type D multivibrators, although many other configurations can be employed as well. In this type of flip/flop, when the clock pulse input is high (binary one), then data on the (D) line is used to operate the flip/flop. If the change of state takes place on the leading or trailing edge of the clock pulse, then the circuit is referred to as an "edge triggered" circuit. The flip/flop 41 is such a device, as can be flip/flop 40. Many examples of suitable binary multivibrators are known and reference is made to a text entitled "Practical Guide to Digital Integrated Circuits" by A. W. Barber, Parker Publishing Co. (1976).

The flip/flops 40 and 41 form the asynchronous logic circuit 25 of FIG. 2 and the Q output of flip/flop 40 provides the NRZ data output (FIG. 1D).

Hence, as can be seen from FIG. 3, the clock output (FIG. 1C) is provided at the output of gate 32. Gate 35 responds to detect zero transitions in the output of gate 30. Hence, if a transition does not occur at the center of a bit cell, then gate 35 provides an output. This is the clock input for the flip/flop 41, which causes flip/flop 40 to provide a binary one output only when there is no transition. If a transition is present, the flip/flop 40 provides a zero output. By controlling flip/flop 41 from flip/flop 40, one is assured that the detection of a zero transition occurs as required. In this logic, the detection of a zero transition indicates that the data bit is a binary zero. If a zero transition is not detected, this assumes a transition did occur and that the data bit was a binary one. It should therefore be understood that FIG. 3 is a hardware implementation of FIG. 2 and that many alternate configurations are possible.

The decoder described offers significant advantages apart from the simplicity of implementation. As indicated, by using the decoder for AMI signals, one eliminates the need for a phase locked loop (PLL) or injection locked oscillator (ILO). In any event, it is also noted that if cummulative jitter is expected to be a problem as in the case with transmission links employing several repeaters, one can use a simple phase locked loop which operates to lock the clock output signal as from gate 32. This clock can then be used to re-encode the AMI data and hence, reduce jitter. This approach is extremely simple and efficient as compared to prior art uses of the phase locked loop in such transmission systems. Hence, the PLL need not be used to decode the data as done in the prior art. As described above, the clock signal is retrieved as well as the data, and the clock signal is of a fixed duration and at a fixed repetition rate, thus enabling a simple PLL structure to be accommodated when necessary.

It is understood, as above indicated, that the principles of this invention have been described in detail, with reference to specific apparatus. Such apparatus is made only by way of example and not as a limitation to the scope of the invention as set forth in the accompanying claims.

I claim:

1. A decoder apparatus for use in a data transmission system in which information is conveyed in a bit stream consisting of a plurality of sequential bit cells, said stream of the type employing an alternate mark inversion (AMI) code, wherein the start of each bit cell is manifested by a first transition, each bit cell having a given duration T, with those bits indicative of a first binary value further possessing a transition at the center of said bit duration (T/2) to distinguish this first binary value from a second binary bit value with those bits of said second value having no transition at said center, said decoder comprising:

transition detector means responsive to said AMI bit stream for providing at an output, a plurality of pulses indicative of each transition in said AMI bit stream, whereby said plurality of pulses has at least a separate pulse for the start of each bit and a pulse indicative of a transition at the center of those bits of said first value, center bit cell detector means responsive to said plurality of pulses at the output of said transition detector for responding to only those pulses indicative of said center transition, and therefore of said first binary value, logic means responsive to said plurality of pulses from said transition detector means and said detected pulses to provide at an output, a digital signal indicative of the information conveyed by said AMI code, by outputting a first binary level during a next succeeding start pulse when a transition was detected at the center of a previous pulse, and outputting a second binary level when a transition was not detected, whereby said output digital signal manifests the original information encoded within said AMI bit stream.

2. The decoder apparatus according to claim 1 wherein
said logic means includes means for storing a first value indicative of a transition occurring at the center of said previous pulse for outputting a first binary value during the next pulse, and for storing a second value indicative of no transition for outputting a second binary value during said next pulse.

3. The decoder apparatus according to claim 1 wherein
said digital signal provided by said logic means is of a NRZ (non-return to zero) format.

4. The decoder apparatus according to claim 1 wherein
said logic means further includes means responsive to said plurality of pulses from said transition detector means and said center of bit cell detector means for providing at an output, a train of pulses having a repetition rate indicative of the clock employed to provide said AMI code.

5. The decoder apparatus according to claim 1 wherein
said transition detector means includes a gate having first and second inputs and an output, with said AMI bit stream applied to said first input, a delay circuit in series with said second input with said AMI bit stream applied to said delay circuit to cause said gate to provide at an output, said plurality of pulses, each of a duration determined by the delay associated with said delay circuit.

6. The decoder apparatus according to claim 5 wherein
said delay associated with said delay circuit is substantially less than said bit cell duration T.

7. The decoder apparatus according to claim 5 wherein
said center bit cell detector means includes a monostable multivibrator having a trigger input coupled to the output of said gate for providing a fixed pulse duration output for each pulse emanating from said gate.

8. The decoder apparatus according to claim 7 wherein
said duration of said monostable multivibrator is greater than one-half of said duration T and desirably about three-quarter T.

9. The decoder apparatus according to claim 7 including
a first AND gate having one input responsive to said monostable output, and a second input responsive to said plurality of pulses emanating from said transition detector means, to provide at an output, a train of pulses indicative of the clock used to encode said AMI signals.

10. The decoder apparatus according to claim 9 including
a second AND gate having one input responsive to said plurality of pulses emanating from said transition detector means and a second input responsive to said monostable output for providing at an output, a series of pulses indicative of said center transitions.

11. The decoder apparatus according to claim 2 wherein
said means for storing includes first and second bistable multivibrators.

* * * * *